US009166410B1

(12) United States Patent
Kim et al.

(10) Patent No.: US 9,166,410 B1
(45) Date of Patent: Oct. 20, 2015

(54) LINE BALANCING FOR A THREE-PHASE ALTERNATING CURRENT SYSTEM

(75) Inventors: Sangsun Kim, San Jose, CA (US); Anthony Tonizzo, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 774 days.

(21) Appl. No.: 13/420,268

(22) Filed: Mar. 14, 2012

(51) Int. Cl.
*H02J 3/26* (2006.01)

(52) U.S. Cl.
CPC ........................................ *H02J 3/26* (2013.01)

(58) Field of Classification Search
USPC ............................................................. 307/14
See application file for complete search history.

(56) References Cited

U.S. PATENT DOCUMENTS

| 5,519,600 A | 5/1996 | Ahladas |
| 5,638,265 A | 6/1997 | Gabor |
| 5,920,129 A | 7/1999 | Smith |
| 6,018,203 A * | 1/2000 | David et al. ...................... 307/52 |
| 6,542,023 B1 | 4/2003 | Daun-Lindberg et al. |
| 7,715,215 B1 | 5/2010 | Bosco et al. |
| 8,009,450 B2 | 8/2011 | Royak et al. |
| 8,193,662 B1 | 6/2012 | Carlson et al. |

* cited by examiner

*Primary Examiner* — Rexford Barnie
*Assistant Examiner* — Dru Parries
(74) *Attorney, Agent, or Firm* — Fish & Richardson P.C.

(57) ABSTRACT

System for providing AC line balancing includes a three-phase power source, a monitoring component and a control component. Three AC lines from the three-phase power source are coupled to a first set of loads and a set of transfer switches. Additionally, the set of transfer switches are configured to be coupled to a second set of loads. The monitoring component is configured to detect current provided by the three AC lines to identify the AC lines providing the highest and the lowest levels of currents to the first and second sets of loads. The control component is configured to configure at least one transfer switch in the set of transfer switches to decouple the AC line providing the highest level of current to a load of the second set of loads and couple the AC line providing the lowest level of current to that load.

19 Claims, 11 Drawing Sheets

| PHASE CURRENT | SWITCH 302 | SWITCH 304 | SWITCH 306 |
|---|---|---|---|
| A > B > C | A → B | B → C | C |
| A > C > B | A → B | B | C |
| B > C > A | A | B → C | C → A |
| B > A > C | A | B → C | C |
| C > A > B | A → B | B | C → A |
| C > B > A | A | B | C → A |

FIG. 5

LINE BALANCING FOR A THREE-PHASE ALTERNATING CURRENT SYSTEM

TECHNICAL FIELD

The subject disclosure relates to a three-phase power source system and, more particularly, to line balancing for a three-phase alternating current power source system.

BACKGROUND

Three-phase power supplies are utilized for various high-power applications, including, but not limited to, industrial and/or communication systems. Three-phase power is a common form of electrical power and a popular method of electric power transmission and distribution. This is mainly due to its inherent benefits for high power transmission and its smooth wave form quality which allow three-phase electrical equipment to run smoothly and last longer. A three-phase system is generally more economical than others because it uses less conductor material to transmit electric power than an equivalent single-phase or two-phase system operating at the same voltage.

Three-phase alternating current (AC) lines are typically not well balanced since the majority of loads are configured to receive a single-phase from a three-phase power supply. Additionally, the majority of loads draw an uneven amount of current from the power supply. Unbalanced three-phase AC lines present a number of issues for a system. For example, an unbalanced system can cause inefficiency and/or alter the power supplied to a load. Existing three-phase power supplies are able to balance the current from each of the three-phase AC lines, for example, by implementing an active power converter. The active power converter can be implemented to toggle switches coupled to the three-phase AC lines. For example, a portion of current from a first AC line can be transferred to a second AC line by toggling switches. However, implementing the active power converter for AC line balance is complex, expensive and unreliable. Additionally, only a small amount of improvement in overall AC line balance is achieved by implementing the active power converter.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In an implementation, a system for AC line balancing is provided. The system includes a three-phase power source, a monitoring component and a control component. The three-phase power source includes a first AC line configured to provide a first phase current, a second AC line configured to provide a second phase current, and a third AC line configured to provide a third phase current. The first, second and third AC lines are configured to be coupled to a first set of loads and a set of transfer switches. The set of transfer switches are configured to be coupled to a second set of loads. The monitoring component is configured to detect the first phase current, the second phase current and the third phase current provided by the first, second and third AC lines to the first and second sets of loads. The monitoring component is also configured to identify a particular AC line from the first, second and third AC lines that provides the highest level of current to the first and second sets of loads. The monitoring component is also configured to identify a different AC line from the first, second and third AC lines that provides the lowest level of current to the first and second loads.

The control component is configured to configure at least one transfer switch in the set of transfer switches to decouple the particular AC line providing the highest level of current from a load in the second set of loads and couple the different AC line providing the lowest level of current to that load.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which:

FIG. 5 illustrates a chart with exemplary non-limiting configurations of the transfer switches;

DETAILED DESCRIPTION

Figure 1:
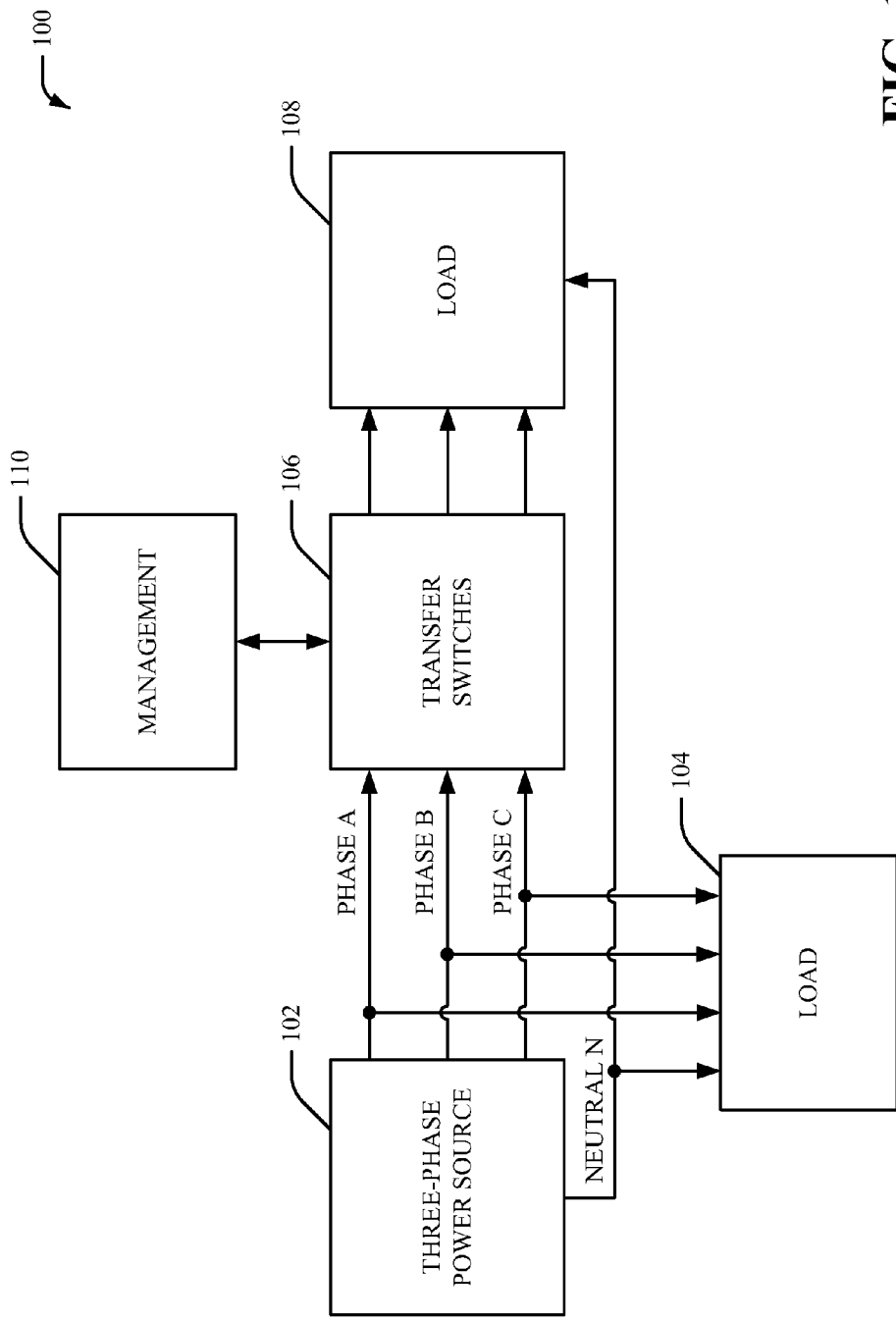
FIG. 1 illustrates a block diagram of an exemplary non-limiting three-phase power source system that provides line balancing.

Various aspects or features of this disclosure are described with reference to the drawings, wherein like reference numerals are used to refer to like elements throughout. In this specification, numerous specific details are set forth in order to provide a thorough understanding of the subject disclosure.

It should be understood, however, that the certain aspects of disclosure may be practiced without these specific details, or with other methods, components, materials, etc. In other instances, well-known structures and devices are shown in block diagram form to facilitate describing the subject disclosure.

According to an aspect of the subject disclosure, systems and methods disclosed herein provide line balancing in a three-phase power source system. A set of server loads can be directly coupled to the three-phase power source. Additionally, a set of transfer switches can be coupled between a set of non-server loads and the three-phase power source. The transfer switches can be controlled based on overall current levels provided by the three-phases of the three-phase power source. For example, if the overall current levels provided by the three-phases of the three-phase power source are approximately equal (e.g., within a predetermined specification), then the transfer switches can be configured to provide the non-server loads with current from the three-phases. However, if the overall current levels provided by the three-phases of the three-phase power source are not approximately equal (e.g., outside a predetermined specification), then the transfer switches can be configured to alter the amount of current provided by each phase of the three-phase power source to the non-server loads. Therefore, the transfer switches can be configured to maintain a balanced system.

Referring initially to FIG. 1, there is illustrated an example system 100 that provides line balancing for a three-phase alternating current (AC) power source system, according to an aspect of the subject disclosure. Specifically, the system 100 can provide a current control feature that can be utilized in most any three-phase AC power source application, for example, by implementing transfer switches coupled between the three-phase AC power source and a load. The system 100 can be employed by various systems, such as, but not limited to, data center systems, network systems, computer network systems, communication systems, router systems, data center systems, server systems, high availability server systems (e.g., Telecom server systems), Web server systems, file server systems, media server systems, disk arrays, powered insertion boards, and the like.

In particular, the system 100 can include a three-phase power source (e.g., a three-phase power supply) 102, a load 104, transfer switches 106, a load 108, and a management component 110. The three-phase power source 102 can be a three-phase four-wire system (e.g., a three phase four-line system, a Wye three-phase system). For example, the three-phase power source 102 can include a first phase line A, a second phase line B, a third phase line C and a neutral line N. The load 104 can include one or more servers (e.g., one or more server loads, one or more critical loads, one or more important loads, etc.). Additionally or alternatively, the load 104 can include one or more network switches. The load 108 can include one or more non-server loads (e.g., one or more non-critical loads). For example, the load 108 can include one or more cooling fans.

The transfer switches 106 can include one or more transfer switches. For example, the transfer switches 106 can include one or more relays and/or one or more semiconductor power switches. The transfer switches 106 can be remotely accessed via a communication bus. For example, the transfer switches 106 can be remotely accessed by the management component 110 via a communication bus. The transfer switches 106 can be toggled based on an overall AC line balance in the system 100. For example, one of the transfer switches 106 can be toggled to decouple an AC line from the load 108 and couple another AC line to the load 108.

The management component 110 can provide monitoring and/or control of the transfer switches 106. For example, the management component 110 can monitor current provided by the three-phase power source 102. If the current provided by the three-phase power source 102 exceeds (or crossed) a predetermined specification (e.g., a predetermined condition, a predetermined current range, a predetermined percentage or a predetermined number), then the management component 110 can determine the AC line (e.g., first phase line A, second phase line B, or third phase line C) that provides the highest level of current and/or the lowest level of current to the load 104 and/or the load 108. As a result, the management component 110 can configure the transfer switches 106 to couple an AC line other than the AC line with the highest current to the load 108 to provide line balancing. For example, the management component 110 can toggle one or more of the transfer switches 106 to provide current from the second phase line B and/or current from the third phase line C if the first phase line A has the highest current. Therefore, the management component 110 can toggle the transfer switches 106 to provide line balancing (e.g., balancing of the first phase line A, the second phase line B and the third phase line C).

Figure 2:
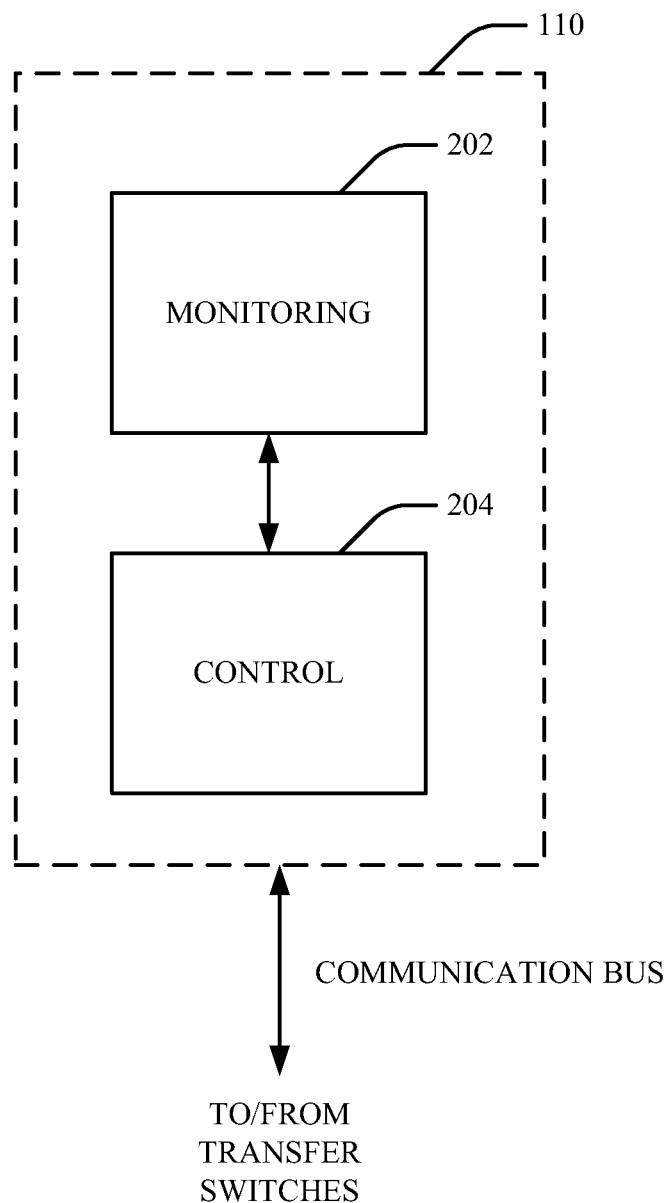
FIG. 2 illustrates a block diagram of an exemplary non-limiting management component that provides monitoring and control of the three-phase power source system.

Referring now to FIG. 2, there is illustrated a non-limiting implementation of the management component 110. The management component 110 can include a monitoring component 202 and a control component 204. The monitoring component 202 can be configured to detect current provided by each of a first, second and third AC lines (e.g., the first phase line A, the second phase line B, and the third phase line C) to the load 104. The monitoring component 202 can also be configured to identify the AC line that provides the highest level of current and/or the lowest level of current to the load 104 and/or the load 108 (e.g., the first phase line A, the second phase line B or the third phase line C). The control component 204 can be configured to configure (e.g., toggle, transfer, arrange, etc.) the transfer switches 106 to couple an AC line other than the identified AC line with the highest current to the load 108. The management component 110 can be configured to access the transfer switches 106 remotely. For example, the management component 110 can be configured to access the transfer switches 106 via a communication bus.

The monitoring component 202 can be configured to monitor current in the system 100. For example, the monitoring component 202 can be configured to monitor current presented to the loads 104 and 108 and/or the transfer switches 106. The monitoring component 202 can also be configured to determine an overall line balance (e.g., current levels) of the first phase line A, the second phase line B, and the third phase line C. Additionally, the monitoring component 202 can be configured to identify the AC line providing the highest level of current and/or the lowest level of current to the load 104, the load 108 and/or the transfer switches 106. Overall line balance of the system 100 can be determined based on a predetermined specification (e.g., a predetermined condition). For example, overall line balance of the three AC lines (e.g., the first phase line A, the second phase line B, and the third phase line C) can be determined based on the variance of current between each of the three AC lines. In one example, the predetermined specification can be a percentage of variance of the current between each of the three AC lines. For example, if the current between the three AC lines are within a 2% tolerance, then the system 100 can be considered balanced. However, if the current between the three AC lines greater than a 2% tolerance, then the system 100 can be considered unbalanced. As a result, the transfer switches can be configured to redistribute current to the load 108 until the current between the three AC lines are within a 2% tolerance.

However, it is to be appreciated that other percentages can be chosen based on the design criteria of a particular implementation. In another example, the predetermined specification can be current threshold values. Therefore, if current from a particular AC line reaches a predetermined limit (e.g., exceeds a threshold), then the system can be considered unbalanced. However, it is to be appreciated that a different type of predetermined specification (e.g., predetermined condition) can be implemented to meet the design criteria of a particular implementation.

The control component 204 can be configured to maintain balance in the system 100 based on information (e.g., current values, data, etc.) provided by the monitoring component 202. For example, the control component 204 can configure the transfer switches 106 to alter the amount of current provided by each of the three AC phase lines to the load 108. The control component 204 can configure at least one of the transfer switches 106 to couple an AC line other than a particular AC line with a highest level of current to the loads 104 and 108 based on information (e.g., current levels of the three AC lines) provided by the monitoring component 202. For example, the control component 204 can configure at least one of the transfer switches 106 to couple the first phase line A and/or the second phase line B instead of the third phase line C, the first phase line A and/or the third phase line C instead of the second phase line B, or the second phase line B and/or the third phase line C instead of the first phase line A to the load 108 in response to a determination that current in the system 100 is unbalanced. Additionally, the control component 204 can configure one or more of the transfer switches 106 based, at least in part, on the AC line providing the lowest level of current. For example, if the first phase line A is identified as the phase with the highest level of current, one or more of the transfer switches 106 can also be configured based on whether the second phase line B or the third phase line C is identified as the phase with the lowest level of current. The control component 204 can also configure the transfer switches 106 to couple the first phase line A, the second phase line B, and the third phase line C to the load 108 in response to a determination that current in the system 100 is balanced.

In one example, the control component 204 can configure the transfer switches 106 to switch all the phase current (e.g., 100% of the phase current) from one AC line to another AC line. For example, the control component 204 can configure the transfer switches 106 to switch 100% of the current from the first phase line A to the second phase line B. However, the control component 204 can additionally or alternatively configure the transfer switches 106 to switch a portion of the phase current (e.g., 50% of the phase current) from one AC line to another AC line. For example, the control component 204 can configure the transfer switches 106 to switch 50% of the current from the first phase line A to the second phase line B. The percentage of phase current switched from one AC line to another AC line can depend on the number of transfer switches that are toggled in the transfer switch 106.

Figure 3:
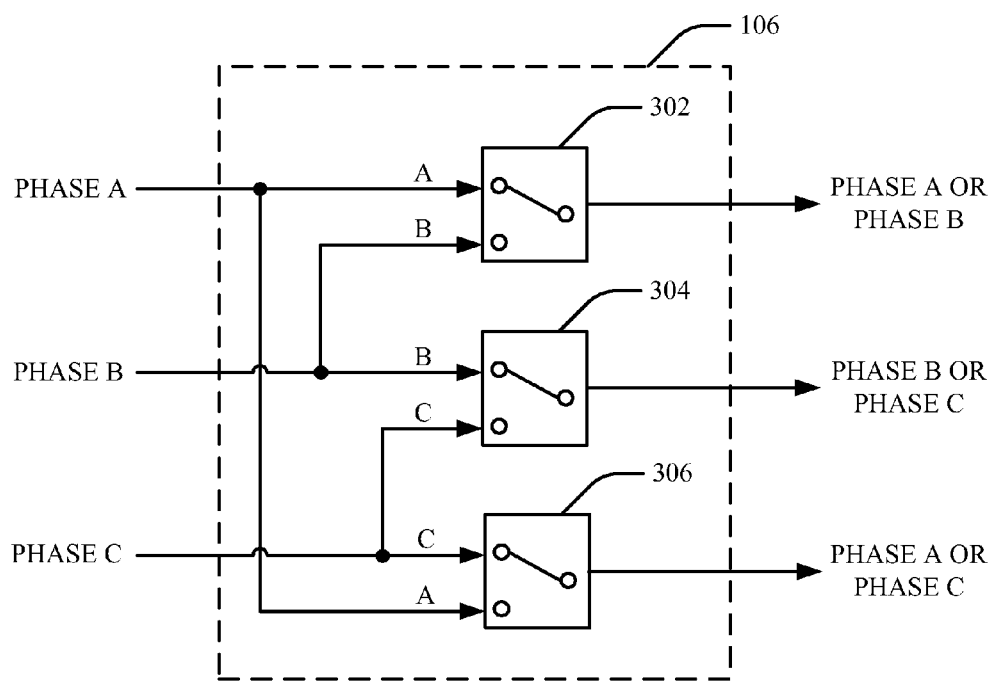
FIG. 3 illustrates a block diagram of an exemplary non-limiting implementation of transfer switches in the three-phase power source system.

Referring now to FIG. 3, there is illustrated a non-limiting implementation of the transfer switches 106. The transfer switches 106 can include a first transfer switch 302, a second transfer switch 304 and a third transfer switch 306. Each of the transfer switches 302, 304 and 306 can be implemented as one or more relays and/or one or more semiconductor power switches. In one example, one or more of the transfer switches 302, 304 and 306 can be implemented as single pole double throw (SPDT) relays. The first transfer switch 302 can be coupled to the first phase line A and the second phase line B. Therefore, the first transfer switch 302 can be toggled to decouple the first phase line A (or the second phase line B) from the load 108 and couple the second phase line B (or the first phase line A) to the load 108. The second transfer switch 304 can be coupled to the second phase line B and the third phase line C. Therefore, the second transfer switch 304 can be toggled to decouple the second phase line B (or the third phase line C) from the load 108 and couple the third phase line C (or the second phase line B) to the load 108. The third transfer switch 306 can be coupled to the first phase line A and the third phase line C. Therefore, the third transfer switch 306 can be toggled to decouple the third phase line C (or the first phase line A) from the load 108 and couple the first phase line A (or the third phase line C) to the load 108. As such, the transfer switches 302, 304 and/or 306 can be toggled to provide balanced phase lines. It is to be appreciated that each of the transfer switches 302, 304 and/or 306 can include one or more transfer switches. Therefore, one or more transfer switches in each of the transfer switches 302, 304 and/or 306 can be toggled to provide balanced phase lines.

Figure 4:
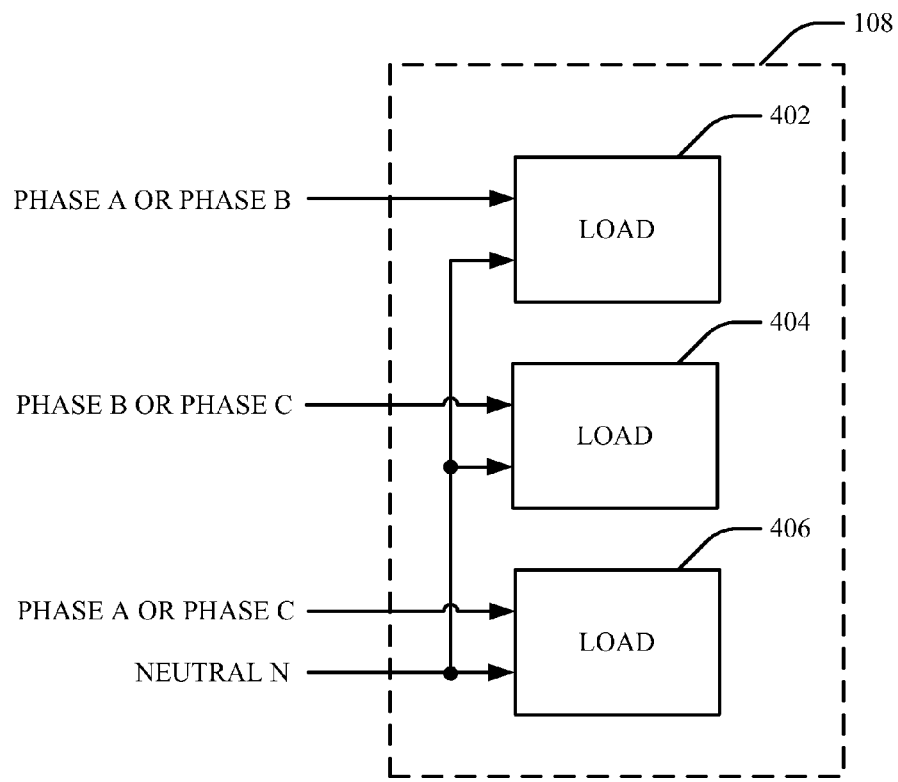
FIG. 4 illustrates a block diagram of an exemplary non-limiting implementation of a first set of loads in the three-phase power source system.

Referring to FIG. 4, there is illustrated a non-limiting implementation of the load 108. In one example, the load 108 can include a load 402, a load 404 and a load 406. In one example, each of the loads 402, 404 and 406 can each include 100 loads. However, it is to be appreciated that the number of loads can be varied to meet the design criteria of a particular implementation. The loads 402, 404 and 406 can be non-server loads. For example, the loads 402, 404 and 406 can be implemented as cooling fans.

The transfer switches 106 can be configured to vary the amount of current provided to the loads 402, 404 and 406 from each phase line. For example, the transfer switches 106 can be configured to provide the load 402 with all the current from the first phase line A or all the current from the second phase line B. In another example, the transfer switches 106 can be configured to provide the load 402 with a portion of the current from the first phase line A and/or the second phase line B. Additionally or alternatively, the transfer switches 106 can be configured to provide the load 404 with all the current from the second phase line B or all the current from the third phase line C. In another example, the transfer switches 106 can be configured to provide the load 404 with a portion of the current from the second phase line B and/or a portion of the current from the third phase line C. Additionally or alternatively, the transfer switches 106 can be configured to provide the load 406 with all the current from the first phase line A or all the current from the third phase line C. In another example, the transfer switches 106 can be configured to provide the load 406 with a portion of the current from the first phase line A and/or a portion of the current from the third phase line C. Each of the loads 402, 404 and 406 can also each be coupled to the neutral line N from the three-phase power source 102.

Referring now to FIG. 5, there is illustrated an example chart 500 showing non-limiting configurations of the transfer switches 106. The transfer switches 106 can be controlled based on the current levels of the first phase line A, the second phase line B, and the third phase line C. For example, the phase line with the highest current and/or the lowest current can be identified. As such, one or more of the transfer switches 302, 304 and 306 can be configured to couple a phase line other than the identified phase line with the highest current to the load 108. For example, if the first phase line A has the highest current, then one or more of the transfer switches 302, 304 and 306 can be toggled to provide the load 108 with current from the second phase line B and/or the third phase line C. In another example, if the second phase line B has the highest current, then one or more of the transfer switches 302, 304 and 306 can be toggled to provide the load 108 with current from the first phase line A and/or the third phase line C. In yet another example, if the third phase line C has the highest current, then one or more of the transfer switches 302, 304 and 306 can be toggled to provide the load 108 with current from the first phase line A and/or the second phase line B. Additionally, one or more of the transfer switches 302, 304 and 306 can also be configured based on the identified phase line with the lowest current. Therefore, the transfer switches 302, 304 and 306 can be toggled to provide the load 108 with a majority of current from the identified phase line with the lowest current.

In one example, the first transfer switch 302 can provide the load 402 with at least a portion of current from the second phase line B, the second transfer switch 304 can provide the load 404 with at least a portion of current from the third phase line C, and the third transfer switch 306 can provide the load 406 with at least a portion of current from the third phase line C in response to a determination by the monitoring component 202 that the current from the first phase line A is greater than the current from the second phase line B and that the current from the second phase line B is greater than the current from the third phase line C. Similarly, the first transfer switch 302 can provide the load 402 with at least a portion of current from the second phase line B, the second transfer switch 304 can provide the load 404 with at least a portion of current from the second phase line B, and the third transfer switch 306 can provide the load 406 with at least a portion of current from the third phase line C in response to a determination by the monitoring component 202 that the current from the first phase line A is greater than the current from the third phase line C and that the current from the third phase line C is greater than the current from the second phase line B.

In another example, the first transfer switch 302 can provide the load 402 with at least a portion of current from the first phase line A, the second transfer switch 304 can provide the load 404 with at least a portion of current from the third phase line C, and the third transfer switch 306 can provide the load 406 with at least a portion of current from the first phase line A in response to a determination by the monitoring component 202 that the current from the second phase line B is greater than the current from the third phase line C and that the current from the third phase line C is greater than the current from the first phase line A. Similarly, the first transfer switch 302 can provide the load 402 with at least a portion of current from the first phase line A, the second transfer switch 304 can provide the load 404 with at least a portion of current from the third phase line C, and the third transfer switch 306 can provide the load 406 with at least a portion of current from the third phase line C in response to a determination by the monitoring component 202 that the current from the second phase line B is greater than the current from the first phase line A and that the current from the first phase line A is greater than the current from the third phase line C.

In yet another example, the first transfer switch 302 can provide the load 402 with at least a portion of current from the second phase line B, the second transfer switch 304 can provide the load 404 with at least a portion of current from the second phase line B, and the third transfer switch 306 can provide the load 406 with at least a portion of current from the first phase line A in response to a determination by the monitoring component 202 that the current from the third phase line C is greater than the current from the first phase line A and that the current from the first phase line A is greater than the current from the second phase line B. Similarly, the first transfer switch 302 can provide the load 402 with at least a portion of current from the first phase line A, the second transfer switch 304 can provide the load 404 with at least a portion of current from the second phase line B, and the third transfer switch 306 can provide the load 406 with at least a portion of current from the first phase line A in response to a determination by the monitoring component 202 that the current from the third phase line C is greater than the current from the second phase line B and that the current from the second phase line B is greater than the current from the first phase line A.

Figure 6:
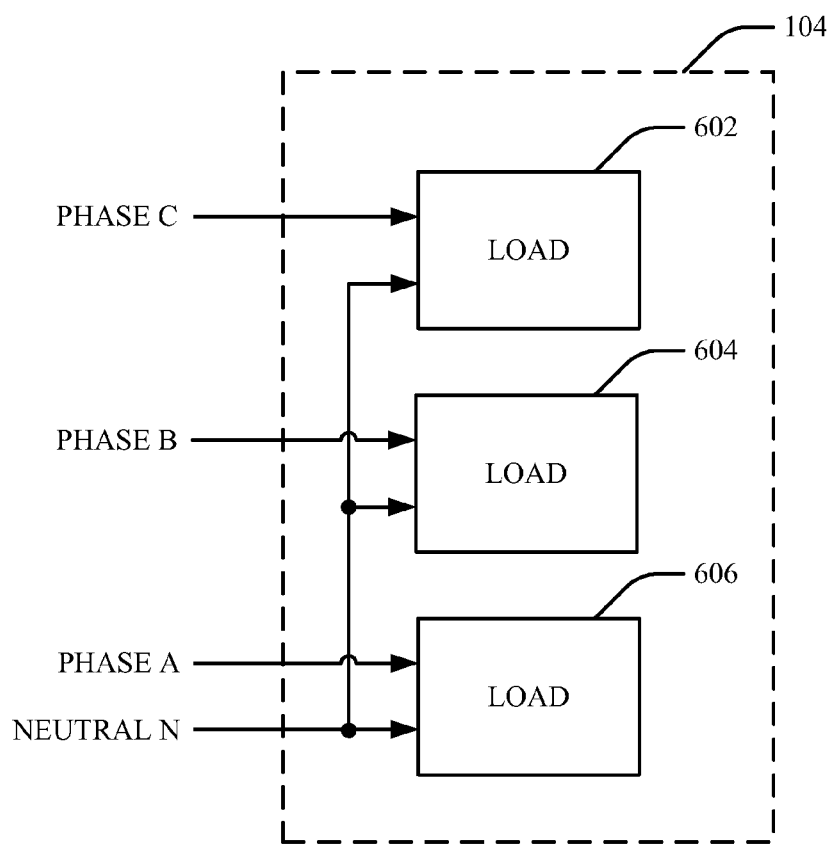
FIG. 6 illustrates a block diagram of an exemplary non-limiting implementation of a second set of loads in the three-phase power source system.

Referring to FIG. 6, there is illustrated a non-limiting implementation of the load 104. The load 104 can include a load 602, a load 604, and a load 606. Each of the loads 602, 604, and 606 can be critical loads (e.g., continuously powered loads, the most important loads in the system 100, etc.). For example, the loads 602, 604, and 606 can be server loads. In one example, the loads 602, 604, and 606 can be implemented as server loads in a data center. Therefore, the loads 602, 604, and 606 can be implemented to receive continuous power from the three-phase power source 102. As such, the load 602 can be coupled to the third phase line C, the load 604 can be coupled to the second phase line B, and the load 606 can be coupled to the first phase line A. However, it is to be appreciated that the loads 602, 604, and 606 can be coupled to different phase lines to meet the design criteria of a particular implementation. For example, the load 602 can be coupled to the first phase line A, the load 604 can be coupled to the second phase line B, and the load 606 can be coupled to the third phase line C. Additionally, each of the loads 602, 604, and 606 can be coupled to the neutral line N.

Figure 7:
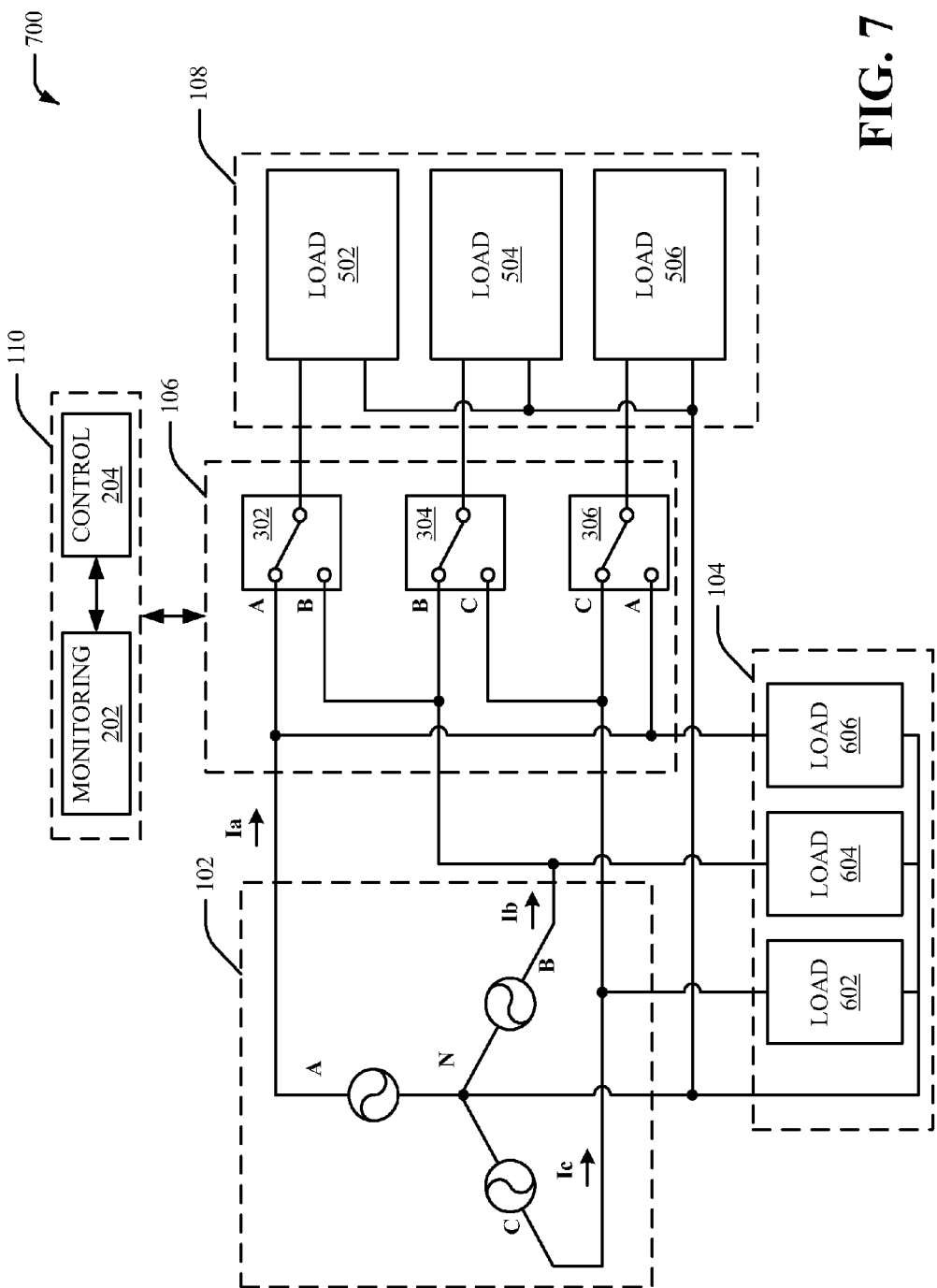
FIG. 7 illustrates a more detailed block diagram of an exemplary non-limiting three-phase power source system that provides line balancing.

Referring to FIG. 7, there is illustrated a non-limiting implementation of the system 700. Current from the first phase line A (e.g., Ia) can be provided to the load 606. The current Ia can also be provided to the transfer switch 302 and/or the transfer switch 306. Therefore, the load 502 and/or the load 506 can receive current from the first phase line A. Current from the second phase line B (e.g., Ib) can be provided to the load 604. The current Ib can also be provided to the transfer switch 302 and/or the transfer switch 304. Therefore, the load 502 and/or the load 504 can receive current from the second phase line B. Current from the third phase line C (e.g., Ic) can be provided to the load 602. The current Ic can also be provided to the transfer switch 304 and/or the transfer switch 306. Therefore, the load 504 and/or the load 506 can receive current from the third phase line C. The monitoring component 202 can monitor the currents Ia, Ib and Ic. In response to current levels of the currents Ia, Ib and Ic, the control component 204 can configure the switches 302, 304 and 306. Therefore, the first phase line A, the second phase line B and the third phase line C can be balanced by configuring the transfer switches 302, 304 and/or 306. As a result, the transfer switches 302, 304 and/or 306 can be configured to alter the amount of current provided by the first phase line A, the second phase line B and the third phase line C to a particular one of the loads 502, 504 and 506.

Figure 8:
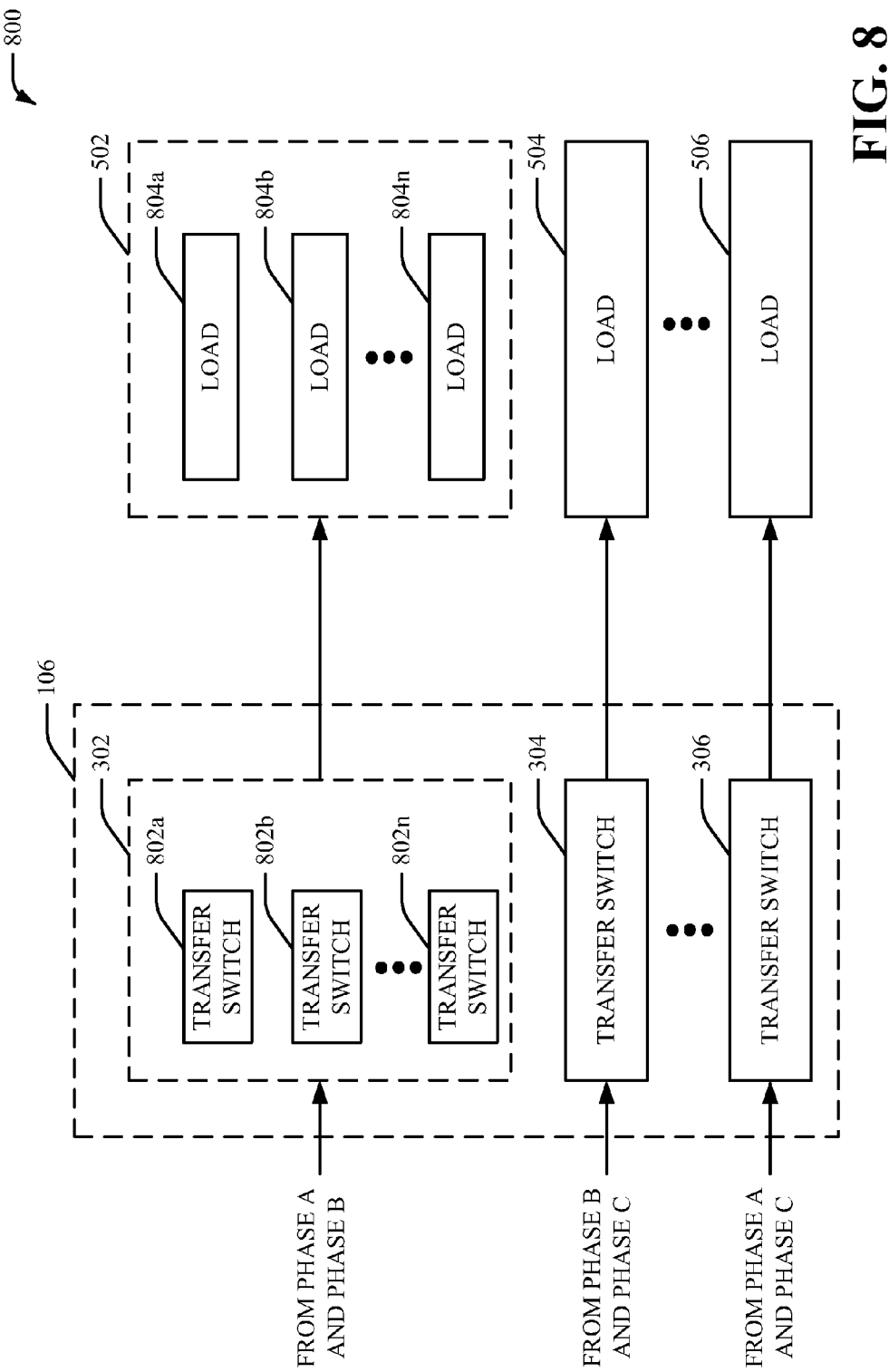
FIG. 8 illustrates an exemplary non-limiting implementation of transfer switches coupled to the second set of loads in the three-phase power source system.

Referring to FIG. 8, there is illustrated a non-limiting implementation of the system 800. The transfer switches 302, 304 and 306 can each include one or more transfer switches 802a-n. Each of the transfer switches 802a-n can be implemented as one or more relays and/or one or more semiconductor power switches. In one example, the transfer switches 802a-n can be implemented as SPDT relay switches. Each of the loads 502, 504 and 506 can include one or more loads 804a-n. In one example, the loads 804a-n can be implemented as 100 loads. For example, the loads 804a-n can be implemented as 100 cooling fans. The number of transfer switches 802a-n can correspond to the number of loads 804a-n. Therefore, each of the transfer switches 802a-n can be coupled to a corresponding load 804a-n (e.g., there can be a 1:1 ratio of transfer switches 802*a-n* and loads 804*a-n*). As such, the total number of transfer switches 802*a-n* can correspond to the total number of loads 804*a-n*. In one example, each of the transfer switches 802*a-n* in the transfer switch 302 can be coupled to the first phase line A and the second phase line B. Furthermore, each of the transfer switches 802*a-n* in the transfer switch 304 can be coupled to the second phase line B and the third phase line C. Additionally, each of the transfer switches 802*a-n* in the transfer switch 306 can be coupled to the first phase line A and the third phase line C.

Therefore, all of the current from a particular phase can be switched to another phase, or a portion of the current from a particular phase can be switched to another phase. For example, the transfer switches 802*a-n* in the transfer switch 302 can all be configured to provide current from the second phase line B instead of the first phase line A. Therefore, all the current from the first phase line A can be switched to the second phase line B. In another example, transfer switches 802*a-d* in the transfer switch 302 can be configured to provide current from the second phase line B and the transfer switches 802*e-n* in the transfer switch 302 can be configured to provide current from the first phase line A. Therefore, a portion of the current from the first phase line A can be switched to the second phase line B. However, it is to be appreciated that the number of transfer switches 802*a-n* that are toggled can be varied. Additionally, it is to be appreciated that switches 802*a-n* in the transfer switch 304 and the transfer switch 306 can be configured likewise.

Figure 9:
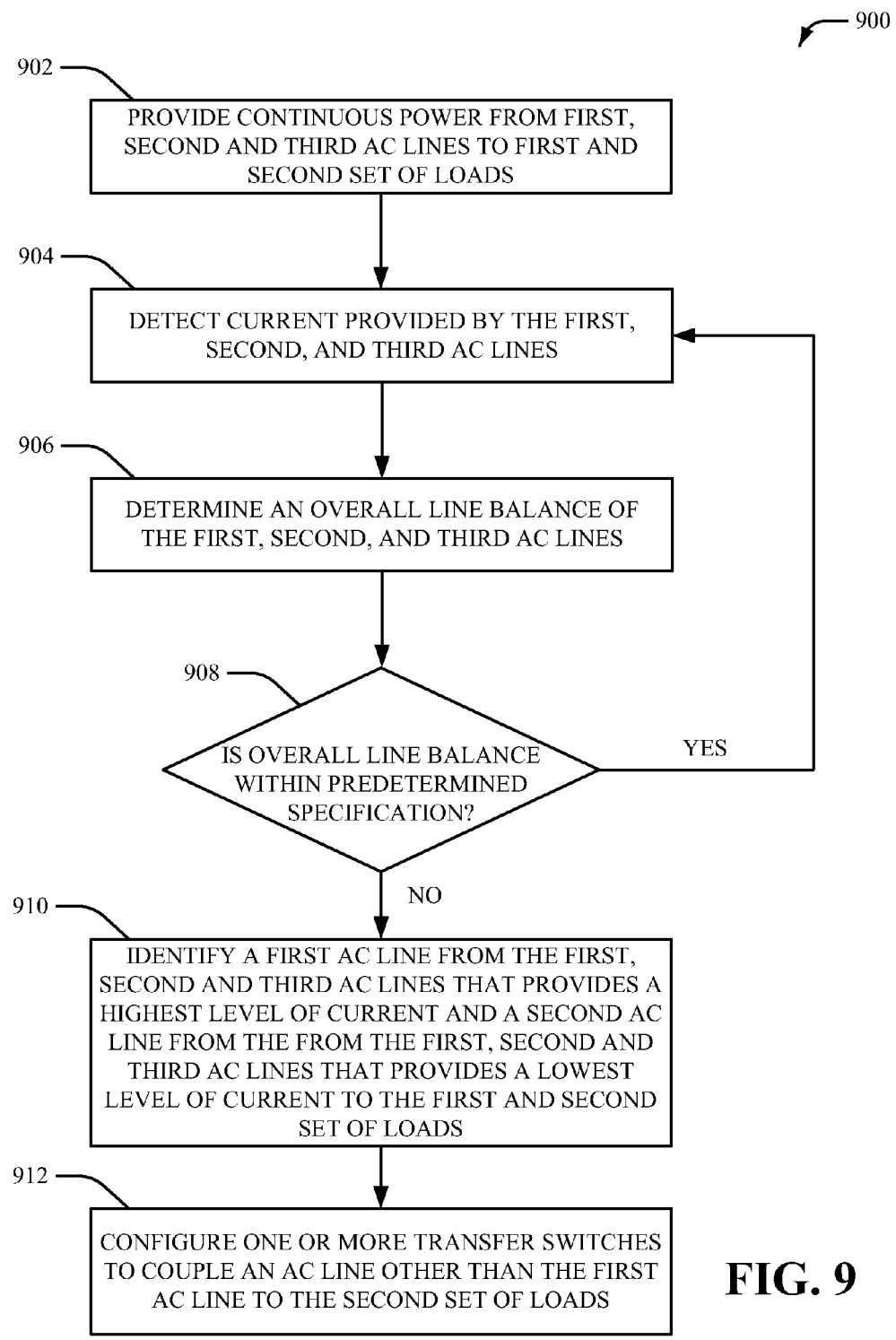
FIG. 9 is an exemplary non-limiting flow diagram for providing a balanced three-phase power source system.
Figure 10:
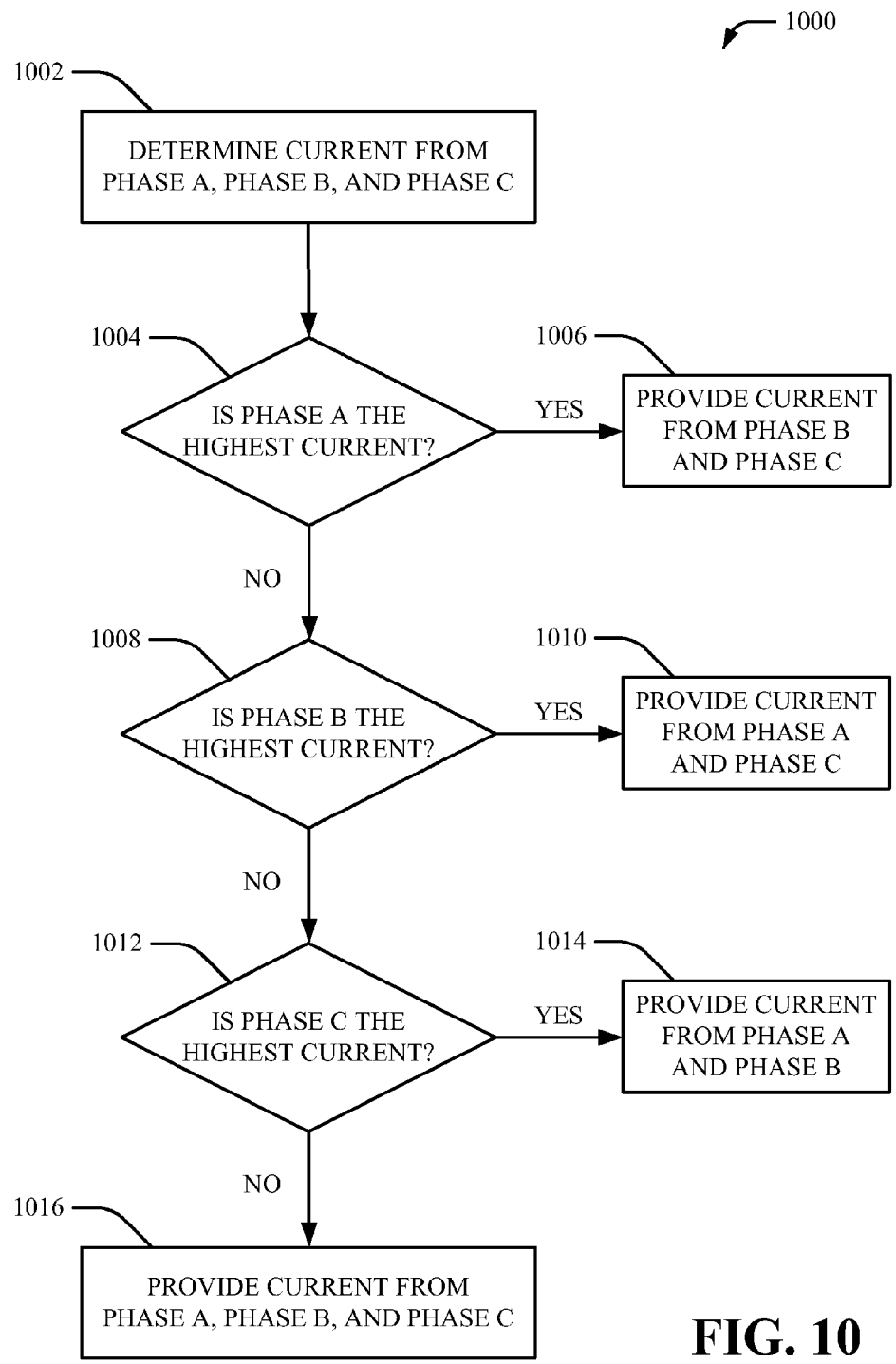
FIG. 10 is an exemplary non-limiting flow diagram for providing monitoring and control in the three-phase power source system.
Figure 11:
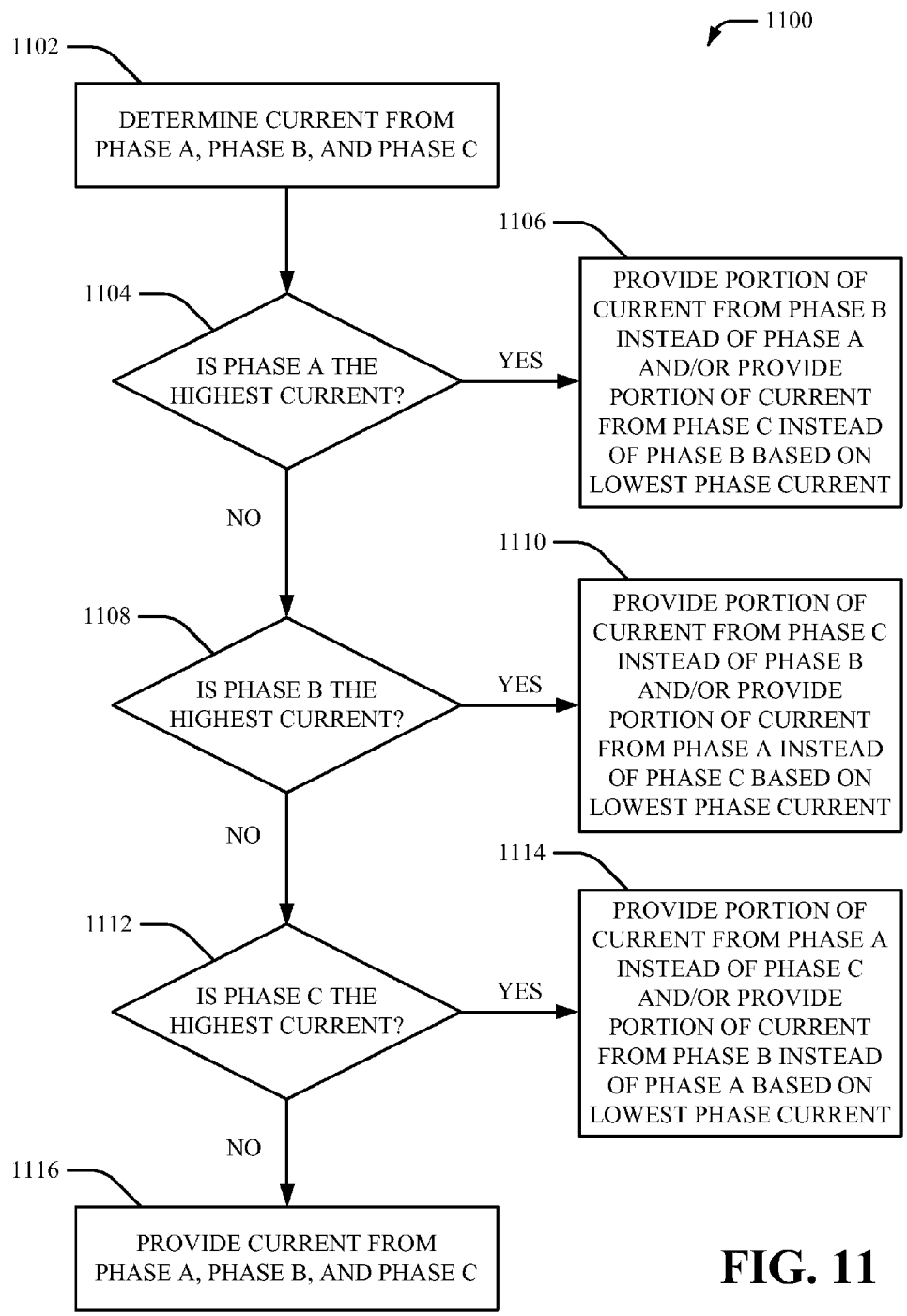
FIG. 11 is another exemplary non-limiting flow diagram for providing monitoring and control in the three-phase power source system.

FIGS. 9-11 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 9, there illustrated is a methodology 900 for implementing a balanced three-phase power source system, according to an aspect of the subject innovation. As an example, methodology 900 can be utilized in various systems, such as, but not limited to, data center systems, network systems, computer network systems, communication systems, router systems, data center systems, server systems, high availability server systems (e.g., Telecom server systems), Web server systems, file server systems, media server systems, disk arrays, powered insertion boards, etc. Moreover, the balanced three-phase power source system can be configured to monitor current to a first set of loads and configure transfer switches to balance current in the system. Specifically, methodology 900 enables switching the amount of current provided to a second set of loads from each phase of the three-phase power source system to provide load balancing.

Initially, the three-phase power source can be switched on and/or connected to a first set of loads and a set of transfer switches. The set of transfer switches can be connected to a second set of loads. At 902, continuous power from first, second and third AC lines can be provided (e.g., by a three-phase power source 102) to first and second sets of loads. For example, the loads 602, 604 and 606 can receive continuous current from the first phase line A, the second phase line B, and the third phase line C. At 904, current provided by a first, second and third AC lines can be detected (e.g., by a monitoring component 202). For example, the monitoring component 202 can detect current provided by the first phase line A, the second phase line B, and the third phase line C to the loads 602, 604 and 606. At 906, an overall line balance of the first, second, and third AC lines can be determined (e.g., by a monitoring component 202). For example, the monitoring component 202 can determine the variance (e.g., percentage difference) of current between the first phase line A, the second phase line B, and the third phase line C. At 908, it can be determined (e.g., by a monitoring component 202) if the overall line balance is within a predetermined specification. For example, an acceptable predetermined specification can be 0%-2% variance of current between the first phase line A, the second phase line B, and the third phase line C. Therefore, if the variance of current between the first phase line A, the second phase line B, and the third phase line C is within 0%-2%, then the system 100 can be considered balanced. However, if the variance of current between the first phase line A, the second phase line B, and the third phase line C is above 2%, then the system 100 can be considered unbalanced. If yes, the methodology 900 can return to 904. If no, the methodology 900 can proceed to 910.

At 910, a particular AC line from the first, second and third AC lines that provides a highest level of current and another AC line from the first, second and third AC lines that provides a lowest level of current to the first and second sets of loads can be identified (e.g., by a monitoring component 202). For example, the monitoring component 202 can determine if the first phase line A, the second phase line B, or the third phase line C has the highest current and if the first phase line A, the second phase line B, or the third phase line C has the lowest current. At 912, one or more transfer switches can be configured (e.g., by a control component 204) to couple an AC line, other than the one providing the highest current, to the second set of loads. For example, the control component 204 can configure the transfer switches 302, 304 and/or 306 to couple the second phase line B and/or the third phase line C to the loads 502, 504, and 506 if it is determined that the first phase line A has the highest current value.

Referring to FIG. 10, there illustrated is a methodology 1000 for implementing a balanced three-phase power source system, according to an aspect of the subject innovation. At 1002, current from phase A, phase B, and phase C can be determined (e.g., by a monitoring component 202). For example, the monitoring component 202 can determine current from the first phase line A, the second phase line B, and the third phase line C. At 1004, it can be determined (e.g., by a monitoring component 202) if phase A is the highest current. For example, the monitoring component 202 can determine if the first phase line A has a higher current than the second phase line B and the third phase line C. If yes, at 1006, current can be provided (e.g., by configuring transfer switches 302, 304 and 306) from phase B and phase C. For example, one or more of the transfer switches 302, 304 and 306 can be configured to provide current from the second phase line B and the third phase line C to the loads 502, 504 and 506. If no, at 1008, it can be determined (e.g., by a monitoring component 202) if phase B is the highest current. For example, the monitoring component 202 can determine if the second phase line B has a higher current than the first phase line A and the third phase line C. If yes, at 1010, current can be provided (e.g., by configuring transfer switches 302, 304 and 306) from phase A and phase C. For example, one or more of the transfer switches 302, 304 and 306 can be configured to provide current from the first phase line A and the third phase line C to the loads 502, 504 and 506. If no, at 1012, it can be determined (e.g., by a monitoring component 202) if phase C is the highest current. For example, the monitoring component 202 can determine if the third phase line C has a higher current than the first phase line A and the second phase line B. If yes, at 1014, current can be provided (e.g., by configuring transfer switches 302, 304 and 306) from phase A and phase B. For example, one or more of the transfer switches 302, 304 and 306 can be configured to provide current from the first phase line A and the second phase line B to the loads 502, 504 and 506. If no, at 1016, current from phase A, phase B, and phase C can be provided (e.g., by configuring transfer switches 302, 304 and 306). For example, the transfer switches 302, 304 and 306 can be configured to provide current from the first phase line A, the second phase line B and the third phase line C to the loads 502, 504 and 506.

Referring to FIG. 11, there illustrated is a methodology 1100 for implementing a balanced three-phase power source system, according to another aspect of the subject innovation. At 1102, current from phase A, phase B, and phase C can be determined (e.g., by a monitoring component 202). At 1104, it can be determined (e.g., by a monitoring component 202) if phase A is the highest current. If yes, at 1106, a portion of current from phase B can be provided (e.g., by configuring one or more transfer switches 802*a-n*) instead of phase A and/or a portion of current from phase C can be provided (e.g., by configuring one or more transfer switches 802*a-n*) instead of phase C based on lowest phase current. For example, one or more transfer switches 802*a-n* can be toggled from phase A to phase B and/or one or more transfer switches 802*a-n* can be toggled from phase B to phase C based on whether phase B or phase C is the lowest current. If no, at 1108, it can be determined (e.g., by a monitoring component 202) if phase B is the highest current. If yes, at 1110, a portion of current from phase C can be provided (e.g., by configuring one or more transfer switches 802*a-n*) instead of phase B and/or a portion of current from phase A can be provided (e.g., by configuring one or more transfer switches 802*a-n*) instead of phase C based on lowest phase current. For example, one or more transfer switches 802*a-n* can be toggled from phase B to phase C and/or one or more transfer switches 802*a-n* can be toggled from phase C to phase A based on whether phase A or phase C is the lowest current. If no, at 1112, it can be determined (e.g., by a monitoring component 202) if phase C is the highest current. If yes, at 1114, a portion of current from phase A can be provided (e.g., by configuring one or more transfer switches 802*a-n*) instead of phase C and/or a portion of current from phase B can be provided (e.g., by configuring one or more transfer switches 802*a-n*) to phase A based on lowest phase current. For example, one or more transfer switches 802*a-n* can be toggled from phase C to phase A and/or one or more transfer switches 802*a-n* can be toggled from phase A to phase B based on whether phase A or phase B is the lowest current. If no, at 1116, current from phase A, phase B, and phase C can be provided (e.g., by configuring one or more transfer switches 802*a-n*).

What has been described above includes examples of the implementations of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated implementations of the subject disclosure is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Further, the word "coupled" is used herein to mean direct or indirect electrical or mechanical coupling.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not illustrated herein.

In regards to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that provides alternating current (AC) line balancing, comprising:
    a three-phase power source including a first AC line that provides a first phase current, a second AC line that provides a second phase current, and a third AC line that provides a third phase current;
    the first, second and third AC lines coupled to a first set of loads that are critical loads that are continuously powered loads for which the AC lines are not switched;
    a first transfer switch that is only coupled to the first AC line and the second AC line;
    a second transfer switch that is only coupled to the second AC line and the third AC line;
    a third transfer switch that is only coupled to the first AC line and the third AC line;
    the first, second, and third transfer switches are coupled to a second set of loads that are non-critical loads for which the AC lines may be switched, wherein the first second, and third transfer switches couple the first, second, and third AC lines to the second set of loads;
    a monitoring component that detects the first phase current, the second phase current and the third phase current provided by the first, second and third AC lines to the first and second sets of loads, and identifies a particular AC line from the first, second and third AC lines that provides a highest level of current to the first and second sets of loads; and
    a control component that configures at least one transfer switch of the first, second, or third transfer switches to couple an AC line other than the particular AC line to the second set of loads.

2. The system of claim 1, wherein a first load from the second set of loads is coupled to the first transfer switch, a second load from the second set of loads is coupled to the second transfer switch, and a third load from the second set of loads is coupled to the third transfer switch.

3. The system of claim 1, wherein the control component causes the first transfer switch to provide the first load with at least a portion of current from the second AC line, the second transfer switch to provide the second load with at least a portion of current from the third AC line, and the third transfer switch to provide the third load with at least a portion of current from the third AC line in response to a determination by the monitoring component that current from the first AC line is greater than current from the second AC line and that current from the second AC line is greater than current from the third AC line.

4. The system of claim 3, further comprising: the control component causes the first transfer switch to provide the first load with at least a portion of current from the second AC line, the second transfer switch to provide the second load with at least a portion of current from the second AC line, and the third transfer switch to provide the third load with at least a portion of current from the third AC line in response to a subsequent determination by the monitoring component that current from the first AC line is greater than current from the third AC line and that current from the third AC line is greater than current from the second AC line.

5. The system of claim 1, wherein the first, second, and third transfer switches correspond to a plurality of loads in the second set of loads.

6. The system of claim 1, wherein the control component toggles at least one transfer switch from the first, second, or third transfer switches to decouple an AC line from a particular load and couple another AC line to the particular load.

7. The system of claim 1, wherein the monitoring component is configured to compare the first, second and third phase currents with each other and rank them from highest to lowest.

8. The system of claim 7, wherein the monitoring component determines that the first, second and third AC lines are not balanced if the difference between any two phase currents is outside a predetermined specification.

9. The system of claim 1, wherein the three-phase power source includes a four-line configuration including a neutral line.

10. The system of claim 1, wherein the first set of loads includes one or more server loads.

11. The system of claim 10, wherein the second set of loads includes one or more non-server loads.

12. The system of claim 1, wherein the monitoring component identifies one of the first, second or third AC lines as providing a lowest level of current to the first set of loads and the second set of loads.

13. The system of claim 12, wherein the control component configures at least one transfer switch of the set of first, second, or third transfer switches to couple the lowest level current providing AC line to the second set of loads, in response to the identification of the lowest level current providing AC line.

14. A method, comprising:
    providing continuous power from first, second and third AC lines, the first, second, and third AC lines coupled to a first set of loads that are critical loads that are continuously powered loads for which the AC lines are not switched;
    a first transfer switch that is only coupled to the first AC line and the second AC line;
    a second transfer switch that is only coupled to the second AC line and the third AC line;

a third transfer switch that is only coupled to the first AC line and the third AC line; and switches, and the first, second, and third transfer switches coupled to a second set of loads that are non-critical loads for which the AC lines may be switched, wherein the first, second, and third transfer switches couple the first, second, and third AC lines to the second set of loads;

detecting currents provided by the first, second and third AC lines;

determining that the difference between the highest and the lowest current levels exceeds a predetermined specification;

identifying a particular AC line from the first, second and third AC lines that provides the highest level of current and another AC line from the first, second and third AC lines that provides the lowest level of current to the first and second sets of loads; and configuring one or more of the first, second, or third transfer switches to couple the another AC line to the second set of loads.

15. The method of claim 14, wherein the configuring includes toggling a particular transfer switch from the one or more of the first, second, or third transfer switches to decouple the particular AC line from a particular load of the second set of loads and couple the another AC line to the particular load.

16. The method of claim 14, wherein the configuring includes configuring the one or more of the first, second, or third transfer switches to couple the first, second, and third AC lines to the second set of loads in response to determining that the difference between the highest and lowest current levels is within a predetermined specification.

17. An apparatus comprising a computer readable medium storing the following computer executable components:

a monitoring component that detects current provided by first, second and third AC lines from a three-phase power source that are directly coupled to a first set of loads that are critical loads that are continuously powered loads for which the AC lines are not switched, a first transfer switch that is only coupled to the first AC line and the second AC line;

a second transfer switch that is only coupled to the second AC line and the third AC line;

a third transfer switch that is only coupled to the first AC line and the third AC line;

the first, second, and third transfer switches coupled to a second set of loads that are non-critical loads for which the AC lines may be switched, wherein the first, second, and third transfer switches couple the first, second, and third AC lines to the second set of loads, and the monitoring component to identify a particular AC line from the first, second and third AC lines that provides a highest level of current; and a control component that toggles at least one transfer switch of the first, second, or third transfer switches to couple an AC line other than the particular AC line to a set of loads.

18. The apparatus of claim 17, wherein the monitoring component determines whether variation in current between the first, second and third AC lines is within a predetermined specification.

19. The apparatus of claim 18, wherein the control component toggles the at least one transfer switch of the first, second, or third transfer switches in response to a determination that the variation of the current between the first, second and third AC lines is not within the predetermined specification.

* * * * *